though the reaction conditions are incorporated herein by reference to that patent.

United States Patent Office 3,480,564
Patented Nov. 25, 1969

3,480,564
OXIDATION CATALYST
John F. O'Brien, Louisville, Ky., and Donald R. Broughton, New Albany, Ind., assignors to Catalysts and Chemicals, Inc., Louisville, Ky., a corporation of Delaware
No Drawing. Filed Jan. 22, 1968, Ser. No. 699,292
Int. Cl. B01j 11/82, 11/46
U.S. Cl. 252—435       3 Claims

ABSTRACT OF THE DISCLOSURE

A catalyst particularly effective for the oxidation of propylene-ammonia mixtures to form acrylonitrile consists essentially of oxides of molybdenum and phosphorus in conjunction with a synergistic combination of arsenic and tin oxides. The mol ratio of tin to arsenic is 1.8 to 3.2:1. The catalyst is also useful for the oxidation of olefins to aldehydes and ketones and for the oxidative dehydrogenation of olefins to diolefins.

BACKGROUND OF THE INVENTION

This invention relates to oxidation catalysts. In one of its aspects the invention relates to catalysts for the oxidation of olefins to form aldehydes and ketones, and for the oxidative dehydrogenation of olefins to form diolefins. In a particular aspect this invention pertains to catalysts for the oxidation of olefin-ammonia mixtures to unsaturated nitriles, for example the oxidation of propylene-ammonia mixtures to form acrylonitrile.

The preparation of unsaturated aliphatic nitriles, and particularly acrylonitrile, is exemplified in such patents as U.S. 3,293,279. A short-chain olefin, for example, propylene or isobutylene, together with ammonia and oxygen, in vapor phase, are passed over a catalyst at elevated temperatures. The molar ratio of oxygen to olefin in the feed to the reaction vessel is in the range of 0.1 to 5:1, a ration of 0.5 to 1.5:1 being preferred. The ammonia-olefin ratio is in the range of .01 to 5:1, preferably 1:1.

As indicated in 3,293,279, water can be fed to the reactor, or it may be omitted. It acts as a diluent and, when used, the preferred amounts, in the form of water vapor, range in from 0.05 to 2.0 mols, or more per mol of propylene in the feed. The temperature of the reaction can be varied from about 300° C. to about 600° C., but preferably ranges from about 400° C. to about 550° C. The reaction is not significantly pressure dependent. For example, it can be operated satisfactorily at atmospheric pressure, which condition is preferred, but lower or subatmospheric pressures and higher or super-atmospheric pressures can also be used to give generally similar good results, e.g. from slightly below atmospheric to about 5 atmospheres. The gaseous hourly space velocity (GHSV) can also be varied widely. For example, values as low as 100, and values as high as 6000 can be used. The preferred gaseous space velocity is in the range of about 150 to about 1000 volumes of gas per volume of catalyst per hour. The catalyst can be used either in a fixed bed or in a fluidized state.

One type of catalyst employed quite successfully in the oxidation of olefin-ammonia mixtures to form unsaturated nitriles contains a heteropoly acid of molybdenum containing phosphorous. One molybdophosphoric acid catalyst used in the production of acrylonitriles is described in U.S. 3,321,411. This catalyst is a mixture of an oxide of arsenic and the heteropoly acid of molybdenum containing phosphorous. A carrier is used, the preferred carrier being silica.

Other phosphomolybdic acid catalysts employed in the oxidation of olefin-ammonia mixtures are described in U.S. 2,904,580. One of the catalysts described in that patent is the tin salt of phosphomolybdic acid. This catalyst is prepared from a solution containing phosphoric acid, molybdic acid, nitric acid and a tin salt, an aqueous colloidal silica sol being included when silica is the carrier.

U.S. 3,186,955 is also directed to the use of molybdenum oxide-phosphorous oxide catalysts for the oxidation of olefin-ammonia mixtures to form unsaturated nitriles, such as methacrylonitrile prepared from isobutylene and ammonia. This patent also describes the utility of molybdenum phosphorous catalysts for the oxidation of olefins to aldehydes and ketones, and for the oxidative dehydrogenation of olefins to diolefins. These being known reactions as illustrated by U.S. 3,186,955, the reaction conditions are incorporated herein by reference to that patent.

Briefly, the oxidation of olefins to aldehydes and ketone refers, for example, to the conversion of propylene to acrolein (which also takes place as a side reaction in the oxidation of olefin-ammonia mixtures), as well as to the conversion of butylene to methyl vinyl ketone, pentene to ethyl vinyl ketone, and cyclopentene to cyclopentenone. This reaction is carried out at a pressure in the range of atmospheric to 100 p.s.i.a., and a temperature in the range of 500° F. to 1000° F. using an oxygen to olefin molar ratio of about 5:1 to 0.5:1.

The oxidative dehydrogenation of olefins refers to the conversion of butylene, amylene, and similar higher olefins having up to eight carbon atoms, to the corresponding diolefins. In this process the feed stream in vapor form containing the olefin to be dehydrogenated and oxygen is conducted over the catalyst at a temperature in the range of 750° F. to 1000° F. to obtain the diolefin. A pressure in the range of atmospheric to 300 p.s.i.a. is used, along with an oxygen to olefin molar ratio of 0.3 to 2:1.

SUMMARY OF THE INVENTION

In accordance with the practice of this invention the combination of arsenic and tin in the heteropoly acid has been found to be synergistic, promoting the catalyst so that conversions are obtained in excess of those obtained by either arsenic or tin alone with the heteropoly acid. Normally if tin is used in combination with arsenic in conjunction with the heteropoly acid of molybdenum containing phosphorous no increase in nitrile yield results. However, it has been found that if selected quantities of the tin and arsenic are employed, and if the ratio of tin to arsenic is within narrowly defined limits, an unexpected increase in acrylonitrile or other nitrile is obtained. The catalyst is also a highly effective olefin dehydrogenation catalyst. The catalyst precursor is a mixture of the oxides, nitrates or carbonates of arsenic, tin and the heteropoly acid of molybdenum containing phosphorous, all incorporated in a carrier. On calcination of the precursor the catalyst composition essentially consists of oxides of molybdenum and phosphorous in conjunction with a synergistic combination of tin and arsenic oxides, the catalytic oxides being combined with 30 to 90 percent carrier by weight based on the total.

DETAILED DESCRIPTION OF THE INVENTION

In the preparation of the catalysts of this invention oxides of arsenic and tin, or compounds readily decomposable to the oxides, are added to a liquid ammonium molybdate-phosphoric acid mixture. When silica is the carrier, it is preferred to add hydrous silica, colloidal silica or silicic acid to the solution. The composition is then dried and calcined to form the oxides. If silica is not employed as a carrier, the liquid mixture is incorporated in the carrier by any of the known methods. Carriers other than silica which can be employed include, for example, silica-alumina, kieselguhr, pumice, titania, zirconia, clay and the like. It has been emphasized that synergism has been found to result only when selected quantities of tin and arsenic oxides are employed. The $SnO_2$ should be used in an amount of 10 to 25 percent of the total catalyst. In addition the ratio of tin to arsenic must be in the range of 1.8 to 3.2:1. A desirable catalyst has the following composition set forth in A, our preferred catalyst being composition B.

Composition A: Percent
$SnO_2$ ------------------------------------ 10–25
$MoO_3$ ------------------------------------ 10–30
$As_2O_5$ ----------------------------------- 5–8
$P_2O_5$ ------------------------------------ 0.5–2
SiO -------------------------------------- 30–90

Composition B: Percent
$SnO_2$ ------------------------------------ 16.0
$MoO_3$ ------------------------------------ 22.2
$As_2O_5$ ----------------------------------- 5.0
$P_2O_5$ ------------------------------------ 0.77
$SiO_2$ ------------------------------------ 56.03

The preparation of the catalysts of this invention, and particularly the synergistic effect obtained thereby, can best be illustrated by reference to specific examples. The preparation of the catalysts employed in the various oxidation reactions to be compared will first be illustrated.

EXAMPLE 1

To 4670 ml. of 30 percent silica sol, 36.1 gm. of 85 percent phosphoric acid are added. To this silica sol mix 666 gm. of molybdenum trioxide are slowly incorporated along with 250 ml. ammonium hydroxide (29 percent $NH_3$) and 600 ml. water to form the molybdenum-phosphorous composition. A slurry is made by adding 150 gm. of arsenic trioxide to a previously prepared solution of $Sn(NO_3)_4$ containing 379 gm. of tin. At a mixing temperature of 82° F. the tin slurry is added to the molybdenum-phosphorous composition. The resulting reaction product is spray dried and then calcined at a temperature of 950° F. for 12 hours to form the catalyst.

EXAMPLE 2

To 5603 gm. of 30 percent silica sol 36.1 gm. of 85 percent phosphoric acid are added at a temperature of about 77° F. After mixing, one liter of $(NH_4)_2Mo_2O_7$ containing 666 gm. of $MoO_3$ is added at 144° F., bringing the temperature up to 85° F. After mixing, a slurry of $SnO_2$ (480 gm.) and 150 gm. of $As_2O_5$ was added. This slurry was formed by reacting 379 gm. tin metal with one liter of 70 percent nitric acid diluted with an additional liter of water, and by adding to it 150 gm. of $As_2O_5$ dissolved in one liter of water. The yellow slurry resulting was dried, and calcined at 950° F. to form the catalyst.

EXAMPLE 3

A catalyst is prepared following the procedure of Example 2 but omitting the arsenic pentoxide. 36.1 gm. of 85 percent phosphoric acid are added to 6893 gm. of 30 percent silica sol. One liter of the $(NH_4)_2Mo_2O_7$ solution containing 666 gm. of $MoO_3$ are then added. To this mixture 243 gm. of the $SnO_2$ slurry described in Example 2 are added. The composition is then calcined as in the preceding examples.

EXAMPLE 4

A catalyst is prepared following the procedure of Example 2 except that the $SnO_2$ solution is not used, the catalyst being devoid of tin. In this catalyst 7204 gm. of 30 percent silica sol, 36.1 gm. of 85 percent phosphoric acid, 1 liter of $(NH_4)_2Mo_2O_7$ containing 666 gm. of $MoO_3$, and 3 liters of an arsenic pentoxide solution are employed. The arsenic pentoxide solution consists of 150 gm. of $As_2O_5$ dissolved in 3 liters of hot water. The catalyst is formed by drying and calcining at about 900° F.

A comparison will now be given of processes utilizing various catalyst prepared by Examples 1 through 4. The catalysts were charged to a reactor and tested for their effectiveness, reaction conditions being reported along with conversion data. The percent conversion (Convn.) to acrylonitrile (ACN) set forth is based on carbon according to Percent conversion (based on carbon) =
$$\frac{\text{grams carbon as acrylonitrile}}{\text{grams carbon fed}} \times 100$$

TABLE 1

| Mols Ratio $C_3H_6$:Air:$NH_3$:$H_2O$ | Temp., °C. | GHSV | Percent $SnO_2$ in Cat. | Sn:As Ratio | Convn. to ACN on $C_3H_6$, percent |
|---|---|---|---|---|---|
| 1:10:1:1 | 454 | 183 | 16.0 | 2.10 | 54.9 |
| 1:10:1:1 | 454 | 183 | 16.0 | 2.45 | 62.0 |
| 1:10:1:1 | 454 | 183 | 8.1 | (¹) | 21.3 |
| 1:10:1:1 | 454 | 183 | 0 | (²) | 19.9 |

¹ No As used.
² No Sn used.

As can be seen in Table 1 yields are obtained by the practice of this invention which are far superior to those obtained when tin and arsenic oxides are used alone.

It has been pointed out that the synergistic effect results only when a given amount of either tin or arsenic is employed and when tin and arsenic are in a mol ratio in the range of 1.8 to 3.2:1. This is illustrated by the following.

TABLE 2

| Mols Ratio $C_3H_6$:Air:$NH_3$:$H_2O$ | Temp., °C. | GHSV | Percent $SnO_2$ in Cat. | Sn:As Ratio | Convn. to ACN on $C_3H_6$, percent |
|---|---|---|---|---|---|
| 1:10:1:1 | 454 | 183 | 16.0 | 2.45 | 62.0 |
| 1:10:1:1 | 454 | 183 | 16.0 | 3.0 | 28.8 |
| 1:10:1:1 | 454 | 183 | 8.0 | 1.25 | 11.1 |
| 1:10:1:1 | 454 | 183 | 10.2 | 1.56 | 17.1 |
| 1:10:1:1 | 454 | 183 | 16.0 | 3.2 | 35.2 |
| 1:10:1:1 | 454 | 183 | 16.0 | 4.2 | 28.6 |
| 1:10:1:1 | 454 | 183 | 14.3 | 1.79 | 43.3 |

In the foregoing examples where arsenic was employed, $As_2O_5$, which is soluble, was used in making the catalyst. Results showing the use of the insoluble form $As_2O_3$, and other variations or substitutions, are set forth in Table 3.

TABLE 3

| Type As | Type Sn | Mols Ratio $C_3H_6$:Air:$NH_3$:$H_2O$ | Temp., °C. | GHSV | Percent $SnO_2$ in Cat. | Sn:As Ratio | Convn. to ACN on $C_3H_6$, percent |
|---|---|---|---|---|---|---|---|
| $As_2O_3$ | $Sn(NO_3)_4$ | 1:10:1:1 | 454 | 183 | 16.0 | 2.10 | 54.9 |
| $As_2O_5$ | $SnO_2$ | 1:10:1:1 | 454 | 183 | 16.0 | 2.45 | 62.0 |
| $As_2O_3$ | $SnO_2$ | 1:10:1:1 | 454 | 183 | 16.0 | 2.43 | 49.7 |
| $As_2O_5$ | $Sn(NO_3)_4$ | 1:10:1:1 | 454 | 183 | 16.0 | 2.43 | 45.8 |

This invention thus provides an excellent oxidation catalyst leading to improved conversions in the production of unsaturated aliphatic nitriles. In addition the catalyst can be employed in the oxidative dehydrogenation of olefins. Ratios of tin to arsenic both below and above the discovered range give poor conversions to acrylonitrile. The values compare with those of either tin or arsenic used alone. However in the case of ratios within the range, due to the synergistic effect, the conversions are much better than with either tin or arsenic alone. Accordingly various processes wherein the catalysts of the invention can be employed will occur to those skilled in the art.

What is claimed is:

1. A catalyst composition consisting essentially of oxides of molybdenum and phosphorus in conjunction with a synergistic combination of arsenic and tin oxides, the catalytic oxides being combined with 30 to 90 percent by weight of a carrier, the catalytic oxides being present in an amount of 10 to 25 percent $SnO_2$ based on the total composition, the mol ratio of tin to arsenic being 1.8 to 3.2:1.

2. A catalyst particularly suited for the oxidation of olefin-ammonia mixtures to form unsaturated nitriles having the composition:

|  | Percent |
|---|---|
| $SnO_2$ | 10–25 |
| $MoO_3$ | 10–30 |
| $As_2O_5$ | 5–8 |
| $P_2O_5$ | 0.5–2 |
| $SiO_2$ | 30–90 |

3. A catalyst particularly suited for the oxidation of propylene-ammonia mixtures to form acrylonitrile having the composition:

|  | Percent |
|---|---|
| $SnO_2$ | 16.0 |
| $MoO_3$ | 22.2 |
| $As_2O_5$ | 5.0 |
| $P_2O_5$ | 0.77 |
| $SiO_2$ | 56.03 |

References Cited

UNITED STATES PATENTS

| 2,881,212 | 4/1959 | Idol et al. | 252—437 XR |
| 3,287,394 | 11/1966 | Young et al. | 252—437 XR |
| 3,379,652 | 4/1968 | Young | 252—435 XR |

PATRICK P. GARVIN, Primary Examiner

U.S. Cl. X.R.

252—437; 260—465.3, 597, 604, 680